United States Patent
Wilson et al.

(10) Patent No.: US 10,680,433 B2
(45) Date of Patent: Jun. 9, 2020

(54) METHODS AND APPARATUS FOR SURGE PROTECTION OF A DISTRIBUTED CONTROL SYSTEM COMPONENT

(71) Applicant: Fisher-Rosemount Systems, Inc., Round Rock, TX (US)

(72) Inventors: Brett Geoffrey Wilson, Lakeway, TX (US); Michael Hayes Truitt, Round Rock, TX (US)

(73) Assignee: FISHER-ROSEMOUNT SYSTEMS, INC., Round Rock, TX (US)

(*) Notice: Subject to any disclaimer, the term of this patent is extended or adjusted under 35 U.S.C. 154(b) by 338 days.

(21) Appl. No.: 15/666,330

(22) Filed: Aug. 1, 2017

(65) Prior Publication Data

US 2019/0044325 A1 Feb. 7, 2019

(51) Int. Cl.
*H02H 9/00* (2006.01)
*H04L 12/26* (2006.01)
*G08B 5/36* (2006.01)
*G08B 21/18* (2006.01)
*H04L 29/08* (2006.01)

(52) U.S. Cl.
CPC ............ *H02H 9/008* (2013.01); *H04L 43/08* (2013.01); *H04L 43/16* (2013.01); *G08B 5/36* (2013.01); *G08B 21/182* (2013.01); *H04L 67/10* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 6,032,203 A | * | 2/2000 | Heidhues | H04L 69/08 709/230 |
| 9,007,186 B1 | * | 4/2015 | Krummey | G06Q 50/06 340/12.32 |
| 9,124,096 B2 | * | 9/2015 | Johnson | H02H 3/202 |
| 2016/0226162 A1 | * | 8/2016 | Erni | H04L 12/413 |

* cited by examiner

*Primary Examiner* — Stephen W Jackson
(74) *Attorney, Agent, or Firm* — Hanley, Flight & Zimmerman, LLC

(57) ABSTRACT

Methods, apparatus, and articles of manufacture are disclosed for surge protection of a distributed control system component. An example apparatus includes an I/O module to be electrically coupled to a field device via a terminal block, the terminal block including a surge protector to reduce an input voltage to an operating voltage when the input voltage satisfies a first threshold, and a communication interface to generate a status message when the input voltage satisfies the threshold.

20 Claims, 8 Drawing Sheets

METHODS AND APPARATUS FOR SURGE PROTECTION OF A DISTRIBUTED CONTROL SYSTEM COMPONENT

FIELD OF THE DISCLOSURE

This disclosure relates generally to process control systems and, more particularly, to methods and apparatus for surge protection of a distributed control system component.

BACKGROUND

In recent years, process control systems, like those used in chemical, petroleum, and/or other processes, have grown progressively more complex with the proliferation of field devices that include more processing power than their predecessors. Current generation process control systems include a greater number and variety of field devices or instruments for measuring and/or controlling different aspects of a process control environment. Devices within the process control system may also be in difficult outdoor environments with exposure to moisture, wide temperature ranges, power quality disturbances, lightning strikes, etc., that can cause accelerated failure.

SUMMARY

Methods, apparatus, and articles of manufacture for surge protection of a distributed control system component are disclosed. An example apparatus includes a terminal module to be electrically coupled to a field device, the terminal module including a surge protector to reduce an input voltage to an operating voltage when the input voltage satisfies a threshold, and a surge protection logic analyzer to generate a status message when the input voltage satisfies the threshold.

An example method includes measuring an input voltage to a surge protector embedded in a terminal block to be electrically coupled to an I/O module and a field device, reducing the input voltage to an operating voltage when the input voltage satisfies a first threshold, and generating a status message when the input voltage satisfies the first threshold.

An example non-transitory computer readable storage medium includes instructions which, when executed, cause a machine to at least measure an input voltage to a surge protector embedded in a terminal block to be electrically coupled to an I/O module and a field device, reduce the input voltage to an operating voltage when the input voltage satisfies a first threshold, and generate a status message when the input voltage satisfies the first threshold.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
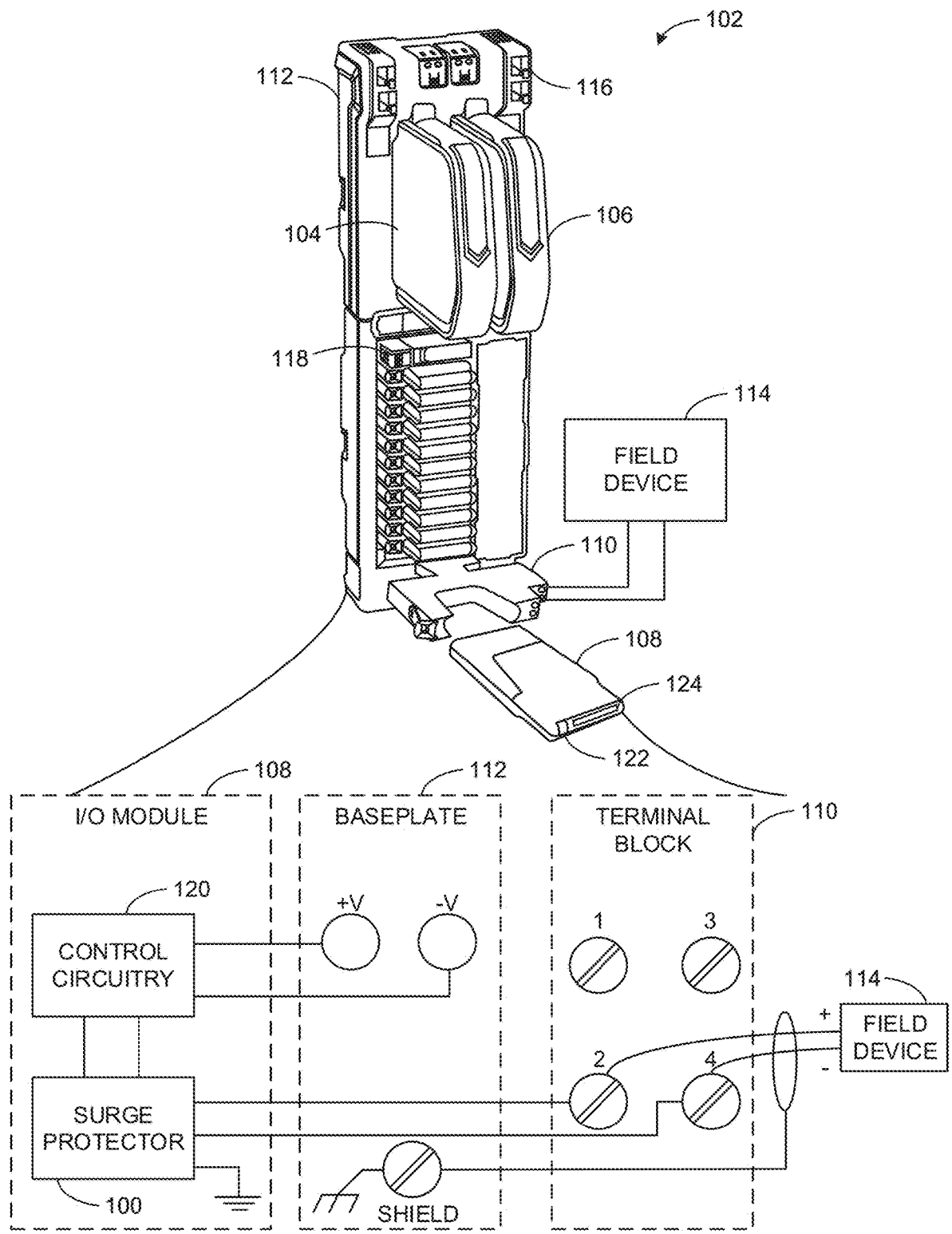
FIG. 1 is a schematic illustration of an example surge protector apparatus included in an example distributed control system controller in accordance with the teachings of this disclosure.

Process control systems such as distributed control systems are growing increasingly complex as individual components with increased data acquisition resolution, processing power and signal conditioning are developed. A distributed control systems (DCS) is used to monitor and/or to control different aspects of an operation to be conducted in a process control environment such as, for example, manufacturing components, processing raw chemical materials, etc. A DCS typically includes multiple controllers (e.g., electronic controllers, programmable controllers, etc.) with accompanying input/output (I/O) modules, which allow the controllers to acquire signals from various input field devices and/or instruments and control various output field devices and/or instruments. An I/O module may include inputs, outputs, and/or a combination thereof.

As used herein, the terms "field device" or "instrument" refer to control devices such as, for example, actuators, actuator assemblies, actuator controllers, actuator positioners, sensors, transmitters, valve assemblies, etc., that may be used throughout a process control system to measure and/or control different aspects (e.g., other process control devices, etc.) of the process control system.

Typical DCS include controllers distributed throughout a process control environment to increase reliability and reduce installation costs by localizing control functions near the process control environment, but enables monitoring and supervisory control of the process control environment remotely. In some examples, DCS controllers and/or remote I/O modules near the process control environment can experience instantaneous or accelerated failure due to exposure to difficult environmental and/or operating conditions including electrical spikes such as current spikes, voltage spikes, etc.

Electrical spikes are fast, short duration electrical transients in voltage (e.g., voltage spikes, etc.), current (e.g., current spikes, etc.), or transferred energy (e.g., energy spikes, etc.) in an electrical circuit. Electrical spikes are a result of electromagnetic pulses (EMPs), either through direct coupling (e.g., a direct lightning strike, etc.) or inductive coupling. An example of inductive coupling may include a lightning-originated EMP traveling down a lightning system down conductor inductively coupled to a signal wire, where nearby parallel conductors to the signal wire pick up a voltage corresponding to the EMP. The effect of a voltage spike is to produce a corresponding increase in current (e.g., a current spike, etc.). As a result, a significant increase in voltage may cause a current spike resulting in fuses to open, bipolar transistors to fail, etc. Alternatively, a current spike can induce a voltage spike. For example, initial discharging current stored in an inductor can result in a voltage. As a result, a significant increase in current may induce voltage levels that can cause damage to electrical components such as field-effect transistors, capacitors, etc.

Electrical spikes can cause damage and/or accelerate failure of a DCS controller, a DCS I/O module, etc. For example, a lightning strike may contact a metal structure (e.g., a pipe, a tank, etc.) coupled to a field device (e.g., an actuator, a sensor, etc.). The lightning strike may cause a voltage spike to travel from the field device to a DCS I/O module electrically coupled to the field device. The voltage spike may damage the DCS I/O module, the corresponding DCS controller, etc.

In prior DCS implementations, DCS controllers and DCS I/O modules are protected by external surge suppression solutions such as DIN rail mountable surge protection terminal blocks. A drawback to these external surge suppression solutions is that they take up additional space inside an electrical enclosure. A DIN rail mountable surge protection terminal block includes an input terminal and an output terminal electrically coupled via surge protection circuitry. In such prior implementations, a field device is electrically coupled to an input of a DIN rail mountable surge protection terminal block. The output of the DIN rail mountable surge protection terminal block is electrically coupled to an input of a DCS controller, a DCS controller I/O module, etc.

Example surge protector apparatus disclosed herein are operative for surge protection of a DCS controller. In some disclosed examples, a DCS controller includes a surge protector apparatus. For example, a surge protector apparatus may be in the same mechanical structure (e.g., a housing assembly, a housing construction, etc.) as the DCS controller. In such an example, the surge protector apparatus is electrically coupled to the DCS controller within the same mechanical structure, within a baseplate mechanical structure coupled to the DCS controller mechanical structure (e.g., a DCS controller baseplate, etc.), etc. Additionally or alternatively, the example surge protector apparatus may be in the same mechanical structure as a DCS controller I/O module, a DCS controller I/O module terminal block, etc. By including the example surge protector apparatus in the DCS controller, the DCS controller baseplate, the DCS I/O module, the DCS I/O module terminal block, etc., a need for external standalone surge protection modules such as DIN rail mountable surge protection terminal blocks is reduced. By integrating the example surge protector apparatus into one of the various DCS components (e.g., the DCS controller, the DCS controller baseplate, etc.), additional functionality can be incorporated such as monitoring a status of power quality of the various DCS components, a status of one or more surge suppression components, transmitting data packets to the DCS controller, etc.

In some disclosed examples, the surge protector apparatus includes a voltage limiting module to reduce an input voltage to a safe level (e.g., a voltage within a normal operating range of a component, etc.). For example, the surge protector apparatus may include a transient voltage suppressor (e.g., a back-to-back diode assembly, a metal oxide varistor, a gas discharge tube, etc., and/or a combination thereof). In some disclosed examples, the surge protector apparatus includes a current limiting module to reduce an input current to a safe level (e.g., a current within a normal operating range of a component, etc.). For example, the surge protector apparatus may include a transient current suppressor (e.g., a high-speed current limiter, etc.). In some disclosed examples, the surge protector apparatus includes one or more filters. For example, the surge protector apparatus may include a, low-pass filter, band-pass filter, a high-pass filter, etc., and/or a combination thereof.

In some disclosed examples, the surge protector apparatus includes both one or more voltage limiting modules and one or more current limiting modules. Due to a non-linear clamping effect of voltage limiting circuitry, an entirety of energy entering the surge protection apparatus may not be able to be shunted and, as a result, a residual decaying voltage may allow a let-through current to pass. In response to the let-through current passing through the voltage limiting circuitry, the current limiting module may be used to reduce the residual current to an acceptable level, a non-destructive level, etc.

In some disclosed examples, the surge protector apparatus includes one or more mechanical and/or electrical indicators. For example, the surge protector apparatus may include a colored surface with descriptive text, a light-emitting diode (LED) indicator, etc. In some disclosed examples, the surge protector apparatus includes one or more communication interfaces to communicate with a DCS controller, a field device, etc. For example, the surge protector apparatus may include a wired communication interface such as an Ethernet-based interface, a fiber-optic-based interface, etc. In another example, the surge protector apparatus may include a wireless communication interface such as a cellular, a near-field communication (NFC) interface, a Wi-Fi interface (e.g., a Wi-Fi Direct® interface, etc.), a Bluetooth® interface, etc.

In some disclosed examples, the surge protector apparatus generates an alert such as a communication message, a status message, etc., based on an input signal satisfying a threshold. For example, the surge protector apparatus may generate an alert when an amplitude of an input voltage satisfies a threshold (e.g., an amplitude is greater than 30 volts direct current (VDC), 50 VDC, 100 volts alternating current (VAC), etc.). In another example, the surge protector apparatus may generate an alert when an input current, a leakage current, etc., satisfies a threshold (e.g., an input current is greater than 1.5 amps, a leakage current is greater than 100 milliamps, etc.).

In some disclosed examples, the surge protector apparatus generates an alert based on a health or a status of the surge protector apparatus. For example, the surge protector apparatus may generate and transmit a communication message via Ethernet to a DCS controller indicating that the surge protector apparatus is active, the surge protector apparatus is damaged, degraded, non-responsive, etc.

FIG. 1 is a schematic illustration of an example surge protector 100 included in an example DCS controller assembly 102 in accordance with the teachings of this disclosure. The DCS controller assembly 102 includes a first controller 104 and a second controller 106. In the illustrated example, the first and the second controllers 104, 106 are characterization module (CHARM) I/O cards (CIOC). Alternatively, any other number or types of electronic controllers may be used. The first and the second controllers 104, 106 perform data acquisition and control operations such as obtaining and processing sensor measurements, transmitting the sensor measurements to an external controller and/or DCS, etc. In the illustrated example, the second controller 106 is a backup to the first controller 104. For example, the second controller 106 may assume primary data acquisition and control responsibilities when the first controller 104 is non-responsive (e.g., damaged, non-operational, etc.).

In the illustrated example of FIG. 1, the first and the second controllers 104, 106 are electrically coupled to I/O modules 108 via terminal blocks 110. The I/O modules 108 are removably coupled to the terminal blocks 110, which are removably coupled to a baseplate 112. In the illustrated example, a first field device 114 is electrically coupled to a first one of the I/O modules 108 via a first one of the terminal blocks 110.

In the illustrated example, the I/O modules 108 are CHARMs. Alternatively, any other type of input and/or output module used for data acquisition and control may be used. Each CHARM is an individual input and/or output channel for the first and the second controllers 104, 106. For example, each one of the I/O modules 108 may be an analog input or output channel, a digital input or output channel, a relay channel, etc. Each of the I/O modules 108 may include analog-to-digital (A/D) conversion circuitry, signal isolation circuitry, etc. For example, the first I/O module 108 may convert a 4-20 milliamp measurement obtained from the first field device 114 into a digital value (e.g., a value ranging from 0-65536 for a 16-bit A/D converter, etc.). The first and the second controllers 104, 106 may obtain the digital value from the first I/O module 108.

In the illustrated example, the terminal blocks 110 are CHARM terminal blocks. Alternatively, any other type of terminal block or electrical interface may be used. Each CHARM terminal block is a removable terminal block providing terminal connections to field wiring. The terminal blocks 110 include one or more input terminals electrically coupled to one or more output terminals. For example, the first terminal block 110 may include one or more input terminals that include push-in terminal connections, screw terminal connections, spring-cage terminal connections, etc., to electrically couple with wired connections from the first field device 114. In another example, the first terminal block 110 may include one or more output terminals (e.g., push-in terminal connections, screw terminal connections, etc.) to electrically couple to the first I/O module 108, to the first and the second controllers 104, 106, to the baseplate 112, etc.

In the illustrated example, the terminal blocks 110 provide a physical latch mechanism for a corresponding CHARM. For example, the first terminal block 110 may be latched onto the first I/O module 108 using one or more mechanical latches to ensure that the first I/O module 108 is mechanically secured in place. In yet another example, the first terminal block 110 may be unlatched from the first I/O module 108 by undoing one or more mechanical latches to remove the I/O module 108 from the first terminal block 110.

In the illustrated example, the baseplate 112 is a CHARM baseplate. Alternatively, any other type of baseplate or hardware interface may be used. For example, the baseplate 112 may be a DIN rail mountable mechanical structure that includes interleaving power and bus (e.g., communication bus, etc.) connectors or connections. In the illustrated example, the baseplate 112 supports twelve I/O modules 108 and twelve terminal blocks 110. Alternatively, fewer or more than twelve I/O modules 108 may be supported or used. Additionally, the baseplate 112 includes communication interfaces 116 and an address plug 118 (e.g., a hardware device that can adjust a network address of the first and the second controllers 104, 106 in a network topology, etc.). For example, the communication interfaces 116 may be wired communication interfaces (e.g., an Ethernet interface, a Serial Communication interface (e.g., RS-232, RS-485, etc.), etc.) or wireless communication interfaces (e.g., NFC, Wi-Fi Direct®, Bluetooth®, etc.).

In the illustrated example, the first field device 114 is a pressure transducer that converts a pressure measurement into a 4-20 milliamp electrical output. Alternatively, any other type of field device may be used. For example, the first field device 114 may transmit a pressure measurement via a two-wire measurement (e.g., a 4-20 milliamp signal, etc.) to the first I/O module 108 via the first terminal block 110.

In the illustrated example of FIG. 1, the surge protector 100 is in the I/O modules 108. In the illustrated example, the surge protector 100 is electrically coupled to control circuitry 120 in the I/O modules 108. The control circuitry 120 is electrically coupled to a power connection indicated by a "+V" and a power return connection indicated by a "−V" in the baseplate 112. Additionally or alternatively, the control circuitry 120 may be electrically coupled to the baseplate 112 with any other number and/or types of connections.

In the illustrated example, the surge protector 100 is electrically coupled to the first field device 114 via the first terminal block 110 connections "2" and "4." In some examples, the surge protector 100 reduces a voltage of an input signal from the first field device 114 when the input voltage satisfies a threshold. For example, the surge protector 100 may compare an amplitude of the input voltage to a threshold and determine whether the amplitude satisfies the threshold (e.g., the amplitude is greater than 50 VDC, 100 VAC, etc.). The example surge protector 100 may reduce the voltage input to a safe level such as a voltage within a normal operating range of the control circuitry 120, the first I/O module 108, the first and the second controllers 104, 106, etc.

In some examples, the surge protector 100 reduces a current of the input signal from the first field device 114 when the input current satisfies a threshold. For example, the surge protector 100 may compare the input current to a threshold and determine whether the input current satisfies the threshold (e.g., the input current is greater than 0.5 amps, 1.5 amps, etc.). The example surge protector 100 may reduce the input current to a safe level such as a current within a normal operating range of the control circuitry 120, the first I/O module 108, the first and the second controllers 104, 106, etc.

In some examples, the surge protector 100 generates an alert based on the input voltage, the input current, the leakage current, etc., satisfying a threshold. For example, the surge protector 100 may direct an activation of an electrical indicator 122 when the surge protector 100 is active, the input voltage satisfies a threshold, the input current satisfies a threshold, etc. In the illustrated example, the electrical indicator 122 is a light-emitting diode (LED). Additionally or alternatively, any other type of an electrical indicator may be used. For example, prior to a power surge event or during a time period in which the surge protector 100 is known to be in good health or operation, the electrical indicator may be unactuated or unpowered. In such an example, during or after a power surge event or during a time period in which the surge protector 100 is known to be degraded (e.g., damaged, etc.) or non-operational, the surge protector 100 may power the electrical indicator 122 (e.g., the LED turns on, etc.).

Alternatively, the electrical indicator 122 may be a multi-LED light source, where a first LED (e.g., a green LED, etc.) may be enabled prior to the power surge event, etc. In such an example, during or after the power surge, etc., the first LED may be disabled while a second LED (e.g., a red LED, etc.) is enabled. Alternatively, any other colors or number of electrical indicators may be used. Additionally or alternatively, any other electrical indicators may be used to demonstrate the change in the health or the operational status of the example surge protector 100.

In some examples, the surge protector 100 directs an activation of an actuable surface 124 (e.g., a colored surface with descriptive text capable of being actuated, etc.) when the surge protector 100 is active, the input voltage satisfies a threshold, the input current satisfies a threshold, etc. In the illustrated example, the actuable surface 124 is operatively coupled to the first I/O module 108 via a spring-loaded mechanism. Alternatively, any other type of mechanical mechanism may be used such as a pivot support (e.g., a gimbal, etc.). For example, the actuable surface 124 may be in a first state, where the actuable surface 124 is a first color and/or displays a first descriptive text. In such an example, the actuable surface 124 may be green and displays text that reads "OK Status". In such an example, the actuable surface 124 may be activated to change to a second state, where the actuable surface 124 is a second color and/or displays a second descriptive text instead of the first color and/or the first descriptive text. In such an example, the actuable surface 124 may be red and displays text that reads "Surge Active". Additionally or alternatively, any other color, text, etc., may be used.

In some examples, the surge protector 100 generates a communication message including an operational status of the surge protector 100 (e.g., the surge protector 100 is active, etc.), a health status of the surge protector 100 (e.g., the surge protector 100 is damaged, the surge protector is non-responsive, etc.), etc., when the surge protector 100 is active, the input voltage satisfies a first threshold, the input current satisfies a second threshold, etc. In some examples, the surge protector 100 along with the corresponding I/O module 108 is replaced when the input voltage satisfies the first threshold, the input current satisfies the second threshold, etc.

In some examples, the surge protector 100 directs the activation of the electrical indicator 122, the activation of the actuable surface 124, a generation of an alert message, etc., when a leakage current satisfies a threshold. For example, the surge protector 100 may measure an amount of leakage current in circuitry of the surge protector 100. For example, the surge protector 100 may measure an increasing amount of leakage current as one or more components of the surge protector 100 degrade. As a result, the example surge protector 100 may determine a health status of the surge protector 100 based on monitoring a value of the leakage current. In some examples, the surge protector 100 compares the leakage current to a threshold and determines whether the leakage current satisfies the threshold (e.g., the leakage current is greater than 10 milliamps, 100 milliamps, etc.). In some instances, the surge protector 100 along with the corresponding I/O module 108 is replaced when the leakage current satisfies the threshold.

Figure 2:
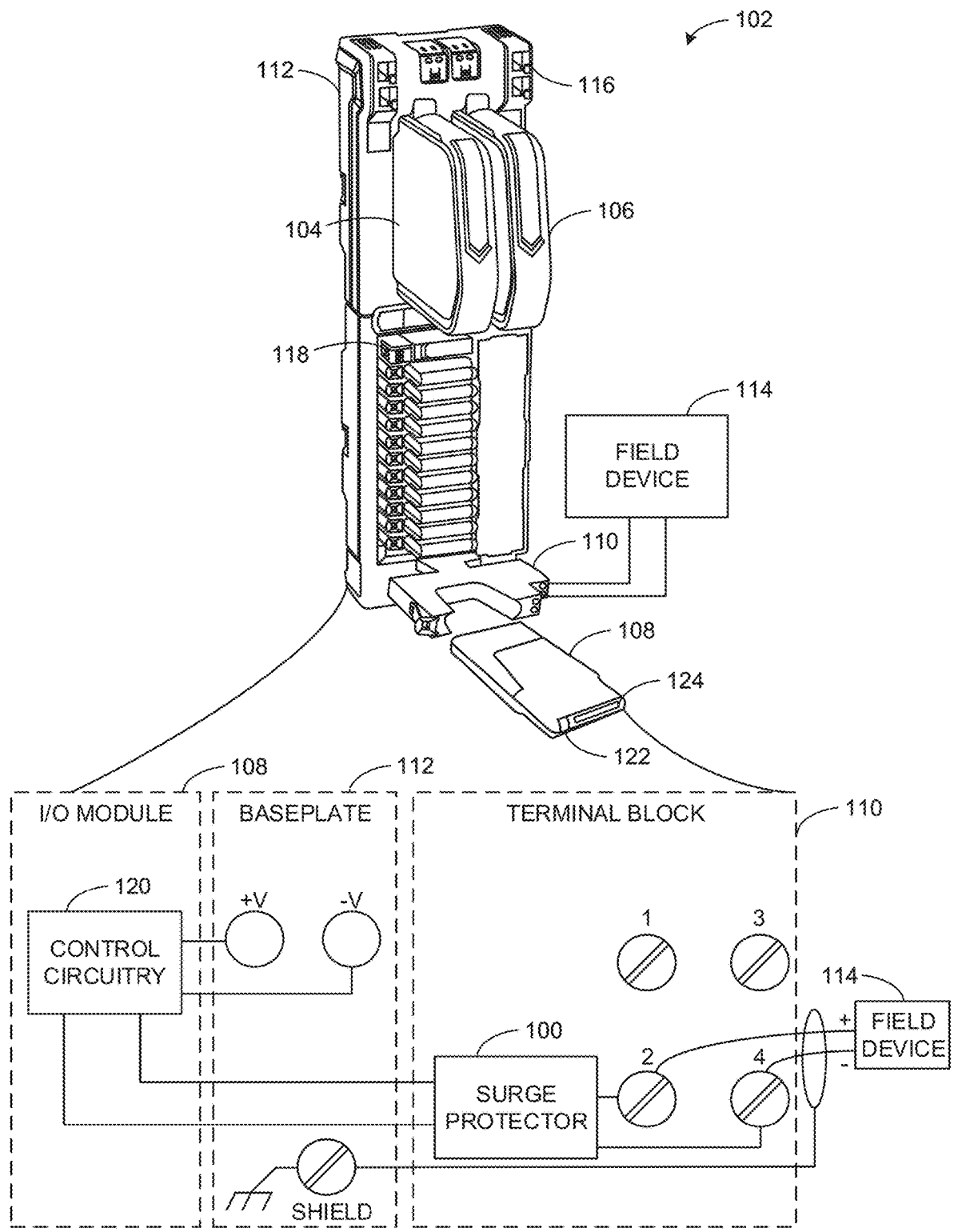
FIG. 2 is another schematic illustration of the example surge protector apparatus included in another example distributed control system controller in accordance with the teachings of this disclosure.

FIG. 2 is another schematic illustration of the example surge protector 100 of FIG. 1 included in the example DCS controller assembly 102 of FIG. 1 in accordance with the teachings of this disclosure. In the illustrated example, the surge protector 100 is in the terminal blocks 110. In the illustrated example, the surge protector 100 is electrically coupled to the control circuitry 120 of FIG. 1, where the control circuitry 120 is in the I/O modules 108. The example surge protector 100 may reduce an input voltage, an input current, etc., from the first field device 114 of FIG. 1 to a safe level as described above in connection with FIG. 1. For example, the surge protector 100 may activate the electrical indicator 122 of FIG. 1, activate the actuable surface 124 of FIG. 1, generate an alert message, etc., as described above in connection with FIG. 1 when the input voltage satisfies a first threshold, the input current satisfies a second threshold, an amount of leakage current satisfies a third threshold, etc. In some examples, the surge protector 100 along with the corresponding terminal block 110 is replaced when the input voltage satisfies the first threshold, the input current satisfies the second threshold, the leakage current satisfies the third threshold, etc.

Figure 3:
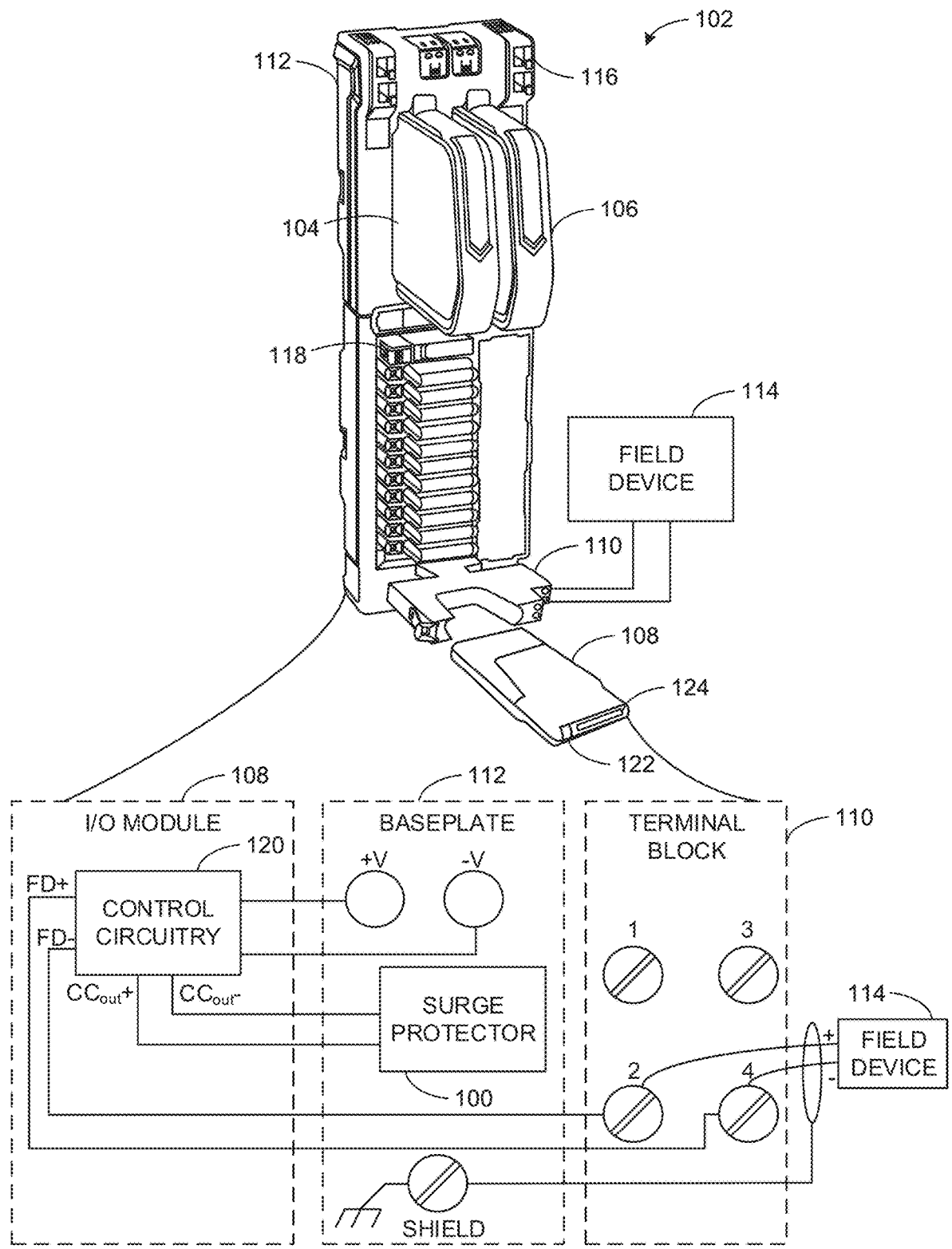
FIG. 3 is yet another schematic illustration of the example surge protector apparatus included in yet another example distributed control system controller in accordance with the teachings of this disclosure.

FIG. 3 is yet another schematic illustration of the example surge protector 100 of FIGS. 1-2 included in the example DCS controller assembly 102 of FIGS. 1-2 in accordance with the teachings of this disclosure. In the illustrated example, the surge protector 100 is in the baseplate 112. In the illustrated example, the surge protector 100 is electrically coupled to the control circuitry 120 of FIGS. 1-2, where the control circuitry 120 is in the I/O modules 108. In the illustrated example, the control circuitry 120 obtains an input signal from the first field device 114 as designated by "FD+" and "FD−". In the illustrated example, the surge protector 100 obtains a processed input signal from the control circuitry 120 as designated by "$CC_{out}+$" and "$CC_{out}−$". The example surge protector 100 may reduce an input voltage, an input current, etc., from the processed input signal to a safe level as described above in connection with FIGS. 1-2. For example, the surge protector 100 may activate the electrical indicator 122 of FIGS. 1-2, activate the actuable surface 124 of FIGS. 1-2, generate an alert message, etc., as described above in connection with FIGS. 1-2 when the input voltage satisfies a first threshold, the input current satisfies a second threshold, an amount of leakage current satisfies a third threshold, etc. In some examples, the surge protector 100 along with the baseplate 112 is replaced when the input voltage satisfies the first threshold, the input current satisfies the second threshold, the leakage current satisfies the third threshold, etc.

Figure 4:
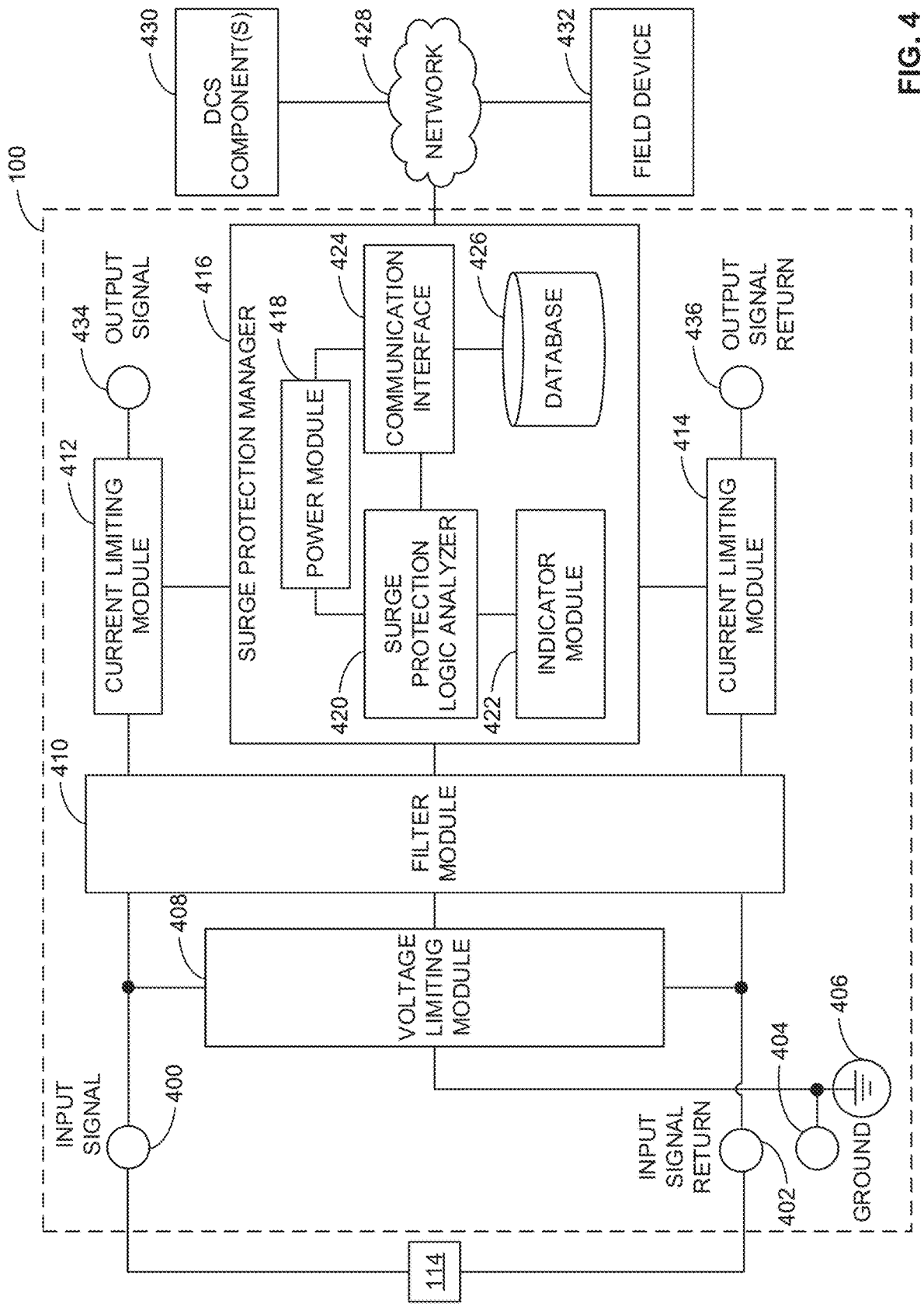
FIG. 4 is a block diagram of an example implementation of the example surge protector apparatus of FIGS. 1-3.

FIG. 4 is a block diagram of an example implementation of the example surge protector 100 of FIGS. 1-3 monitoring an input signal 400 from the first field device 114 of FIGS. 1-3 or from the first field device 114 via the control circuitry 120 and reducing the input signal 400 to a safe level when the input signal 400 satisfies one or more thresholds (e.g., an input voltage satisfies a first threshold, an input current satisfies a second threshold, etc., and/or a combination thereof). In the illustrated example, the first field device 114 is electrically coupled to the input signal 400 and an input signal return 402. In some examples, the first field device 114 is electrically coupled to a ground connection 404, where the ground connection 404 is electrically coupled to a protective earth connection 406.

In the illustrated example of FIG. 4, the surge protector 100 includes an example voltage limiting module 408, an example filter module 410, a first example current limiting module 412, a second example current limiting module 414, and an example surge protection manager 416. In the illustrated example, the surge protection manager 416 includes an example power module 418, an example surge protection logic analyzer 420, an example indicator module 422, an example communication interface 424, and an example database 426. Alternatively, the example database 426 may be separate from the example surge protection manager 416 and/or from the example surge protector 100. The example communication interface 424 is communicatively coupled to an example network 428. Further shown are example DCS component(s) 430, a second example field device 432, an example output signal 434, and an example output signal return 436.

In the illustrated example of FIG. 4, the surge protector 100 includes the voltage limiting module 408 to monitor and/or reduce an input voltage. As used herein, the term "input voltage" refers to a voltage of the input signal 400 with respect to the input signal return 402 and/or the ground connection 404. In the illustrated example, the voltage limiting module 408 is a gas discharge tube, a metal-oxide varistor, a transient voltage suppressor, etc., and/or a combination thereof. For example, the voltage limiting module 408 may compare the input voltage (e.g., an amplitude of the input voltage, etc.) to a reference voltage (e.g., an amplitude of a reference voltage, a reference voltage amplitude, etc.). In such an example, the voltage limiting module 408 may reduce the input voltage to a safe level when the input voltage satisfies a threshold. For example, the voltage limiting module 408 may reduce the input voltage when an amplitude of the input voltage satisfies a threshold (e.g., the input voltage is greater than 50 VDC, 100 VAC, etc.). For example, the voltage limiting module 408 may reduce the input voltage from 100 VDC to 28 VDC when the input voltage satisfies the threshold of 50 VDC, where 28 VDC is a nominal (normal) operating voltage of the DCS controller assembly 102, the I/O modules 108, etc.

In the illustrated example of FIG. 4, the surge protector 100 includes the filter module 410 to filter noise due to electromagnetic interference, radiofrequency interference, etc. For example, the filter module 410 may suppress conducted interference that is present on the input signal 400, the input signal return 402, the ground connection 404, and/or the protective earth 406. In some examples, the filter module 410 includes one or more filters to suppress common mode and/or differential mode interference. For example, the filter module 410 may include a high-pass filter, a low-pass filter, a band-pass filter, etc., and/or a combination thereof. In some examples, the filter module 410 suppresses unwanted noise while enabling desired signals such as DC signals, communication signals (e.g., Highway Addressable Remote Transducer (HART) signals, Foundation Fieldbus signals, etc.), etc., to pass through the filter module 410 unaltered.

In the illustrated example of FIG. 4, the surge protector 100 includes the first current limiting module 412 to monitor and/or reduce an input current of the input signal 400. In the illustrated example, the first current limiting module 412 is a transient current suppressor. Alternatively, any other type of current limiter may be used. For example, the first current limiting module 412 may compare the input current to a reference current. In such an example, the first current limiting module 412 may reduce the input current to a safe level when the input current satisfies a threshold. For example, the first current limiting module 412 may compare the input current to a threshold and determine whether the input current satisfies the threshold (e.g., the input current is greater than 0.5 amps, 1.5 amps, etc.). In response to the input current satisfying the threshold, the first example current limiting module 412 may reduce the input current to the safe level. For example, the first current limiting module 412 may reduce the input current from 0.6 amps to 0.2 amps when the input current satisfies the threshold of 0.5 amps.

In some examples, the first current limiting module 412 characterizes a power surge event based on loading of the first current limiting module 412. For example, the first current limiting module 412 may determine that a power surge event is a major power surge event, a first-tier power surge event, etc., based on the first current limiting module 412 operating at full load, maximum capacity, etc., to reduce an input current to a safe level. In another example, the first current limiting module 412 may determine that the power surge event is a minor power surge event, a second-tier power surge event, etc., based on the first current limiting module 412 operating at a level less than full load, less than maximum capacity, etc., to reduce an input current to a safe level. Alternatively, there may be fewer or more than two characterizations, tiers, etc., of power surge events based on the loading of the first current limiting module 412.

In some examples, the first current limiting module 412 activates an output of the first current limiting module 412 when the input current satisfies a threshold, where the output is electrically coupled to the example surge protection manager 416. For example, the surge protection manager 416 may obtain a value corresponding to the input current from the first current limiting module 412, a communication message (e.g., a data packet, etc.) from the first current limiting module 412, etc., when the first current limiting module 412 activates the output. For example, the first current limiting module 412 may transmit the communication message including the value, an indicator that the value satisfies the threshold, etc., to the surge protection manager 416 when the first current limiting module 412 activates the output.

In the illustrated example of FIG. 4, the surge protector 100 includes the second current limiting module 414 to monitor and/or reduce an input current of the input signal return 402. In the illustrated example, the second current limiting module 414 is a transient current suppressor. Alternatively, any other type of current limiter may be used. In the illustrated example, the second current limiting module 414 may reduce the input current corresponding to the input signal return 402 to a safe level as described above in connection with the first current limiting module 412.

In some examples, the second current limiting module 414 measures an amount of leakage current. For example, the second current limiting module 414 may compare an amount of leakage current to a threshold and determine whether the value satisfies the threshold (e.g., the amount of leakage current is greater than 10 milliamps, 100 milliamps, etc.).

In some examples, the second current limiting module 414 activates an output of the second current limiting module 414, where the output is electrically coupled to the surge protection manager 416 when the leakage current satisfies the threshold. For example, the surge protection manager 416 may obtain a value corresponding to the leakage current from the second current limiting module 414, a communication message (e.g., a data packet, etc.) from the second current limiting module 414, etc., when the second current limiting module 414 activates the output. For example, the second current limiting module 414 may transmit the communication message including the value, an indicator that the value satisfies the threshold, etc., to the surge protection manager 416 when the second current limiting module 414 activates the output.

In the illustrated example of FIG. 4, the surge protector 100 includes the surge protection manager 416 to manage the evaluation of a power surge event and coordinate corresponding surge protection operations. In the illustrated example, the surge protection manager 416 includes the power module 418 to power the surge protection manager 416 and corresponding sub-modules of the surge protection manager 416 (e.g., the surge protection logic analyzer 420, the communication interface 424, etc.). In some examples, the power module 418 provides power using a power supply (e.g., an AC-DC converter, a DC-DC converter, etc.). Alternatively, the example power module 418 may provide power using a battery source (e.g., a lithium-ion battery, etc.), a thermoelectric generator, an energy-farming apparatus, an inductive power source, an electromagnetic power source, etc.

In some examples, the power module 418 provides power using power surge event power. For example, the power module 418 may use the input voltage during a power surge event (e.g., a lightning strike, a short-circuit, etc.) to provide power. In such an example, the power module 418 may keep the surge protection manager 416 in an unpowered state, in a low-powered state (e.g., a sleep mode, etc.), etc., prior to the power surge event. In response to the power surge event, the example power module 418 may power the example surge protection manager 416 using the power from the power surge event. After a time period has elapsed, the power module 418 may return the surge protection manager 416 to the unpowered state, to the low-powered state, etc. For example, the sub-modules of the surge protection manager 416 may complete one or more tasks (e.g., the communication interface 424 may transmit a health status of the surge protector 100 to the DCS components 430 via the network 428, etc.). In such an example, in response to the sub-modules of the example surge protection manager 416 completing the one or more tasks, the example power module 418 may return the surge protection manager 416 to the unpowered state, to the low-powered state, etc. In some instances, the power module 418 stores information in the database 426 such as a timestamp corresponding to when the power module 418 powers the surge protection manager 416, a value of a counter corresponding to a number of times the power module 418 powers the surge protection manager 416, etc.

In the illustrated example of FIG. 4, the surge protection manager 416 includes the surge protection logic analyzer 420 to monitor a health status of the surge protector 100 and/or an operational status of a power surge event. In some examples, the surge protection logic analyzer 420 monitors the health status of the surge protector 100 based on the input signal 400, the input signal return 402, an output of the voltage limiting module 408, an output of the first and the second current limiting modules 412, 414, etc.

In some examples, the surge protection logic analyzer 420 determines a health status of the surge protector 100 by comparing a leakage current to one or more thresholds and determining whether the leakage current satisfies the one or more thresholds. For example, the surge protection logic analyzer 420 may compare the leakage current to a first threshold and determine whether the leakage current satisfies the first threshold (e.g., the leakage current is greater than 500 milliamps, 750 milliamps, etc.). In such an example, the first threshold may correspond to the surge protector 100 in a first degraded condition, where the first degraded condition corresponds to the surge protector 100 requiring replacement (e.g., the surge protector 100 has failed, is non-responsive, etc.). For example, the surge protection logic analyzer 420 may compare the leakage current to a second threshold and determine whether the leakage current satisfies the second threshold (e.g., the input current is greater than 10 milliamps, 100 milliamps, etc.). In such an example, the second threshold may correspond to the surge protector 100 in a second degraded condition, where the second degraded condition corresponds to the surge protector 100 in an operational, but degrading condition.

In some examples, the surge protection logic analyzer 420 determines a health status of the surge protector 100 based on a value of the input voltage, the input current, etc. In some instances, the surge protection logic analyzer 420 determines a health status of the surge protector 100 based on whether the input voltage, the input current, etc., satisfies a threshold. For example, the surge protection logic analyzer 420 may determine that the example surge protector 100 is degrading based on an increasing value of the input voltage, the input current, etc., that the surge protector 100 has a non-operational or non-responsive health status based on the input voltage, the input current, etc., satisfying a threshold, etc.

In some examples, the surge protection logic analyzer 420 determines an operational status of a power surge event based on comparing the input signal 400 (e.g., an input voltage, an input current, etc.) to a threshold and determining whether the input signal 400 satisfies the threshold. For example, the surge protection logic analyzer 420 may compare an amplitude of an input voltage to a threshold and determine whether the amplitude satisfies the threshold (e.g., the amplitude is greater than 50 VDC, 100 VAC, etc.). In another example, the surge protection logic analyzer 420 may compare an input current to a threshold and determine whether the input current satisfies the threshold (e.g., the input current is greater than 0.5 amps, 1.5 amps, etc.). The example surge protection logic analyzer 420 may determine that a power surge event is occurring based on one or more of the above example thresholds being satisfied.

In some examples, the surge protection logic analyzer 420 characterizes a power surge event based on comparing the input signal 400 (e.g., an input voltage, an input current, etc.) to one or more thresholds. For example, the surge protection logic analyzer 420 may compare an input current to a first threshold and determine whether the input current satisfies the first threshold (e.g., the input current is greater than 1.5 amps, 2.5 amps, etc.), where the first threshold is based on whether the input current corresponds to a major power surge event, a primary-tier power surge event, first-tier power surge event, etc. In such an example, the surge protection logic analyzer 420 may compare the input current to a second threshold and determine whether the input current satisfies the second threshold (e.g., the input current is greater than 100 milliamps, 500 milliamps, etc.), where the second threshold is based on whether the input current corresponds to a minor power surge event, a secondary-tier power surge event, a second-tier power surge event, etc. Alternatively, there may be any number of power surge event characterizations determined by any number of thresholds.

In some examples, the surge protection logic analyzer 420 increments a counter based on characterizing a power surge event. For example, the surge protection logic analyzer 420 may increment a counter corresponding to a number of minor power surge events, secondary-tier power surge events (e.g., second-tier, third-tier, etc.), etc., to determine a power quality status, calculate remaining useful life metrics of the surge protector 100, determine a health status of the surge protector 100, etc. In some instances, the surge protection logic analyzer 420 increments a counter based on a measurement of the input signal 400 corresponding to a power surge event satisfying a threshold. For example, the surge protection logic analyzer 420 may increment a first counter when an input voltage satisfies a first threshold. In another example, the surge protection logic analyzer 420 may increment a second counter when an input current satisfies a second threshold. The first and the second thresholds may correspond to values of the input voltage, the input current, etc., during a secondary-tier power surge event.

In some examples, the surge protection logic analyzer 420 compares a value of a counter to a threshold and determines whether the value satisfies the threshold (e.g., the value is greater than 3, 10, 30, etc.). In response to the value of the counter satisfying the threshold, the example surge protection logic analyzer 420 may direct the example indicator module 422 to activate the electrical indicator 122 of FIGS. 1-3, the actuable surface 124 of FIGS. 1-3, etc., the example communication interface 424 to transmit an alert message, etc.

In some examples, the surge protection logic analyzer 420 monitors a status of power quality of the input signal 400, the input signal return 402, etc. For example, the surge protection logic analyzer 420 may determine that a frequency of power surge events indicates a low power quality (e.g., a number of secondary-tier power surge events occurring a time period, etc.). In another example, the surge protection logic analyzer 420 may determine that a frequency of the first and the second current limiters 412, 414 operating at maximum capacity indicates a low power quality (e.g., a number of primary-tier power surge events occurring during a time period, etc.).

In some examples, the surge protection logic analyzer 420 enables the indicator module 422 and/or the communication interface 424 to perform an operation. For example, the surge protection logic analyzer 420 may direct the indicator module 422 to activate the electrical indicator 122, the actuable surface 124, etc. In such an example, the surge protection logic analyzer 420 may direct the indicator module 422 when the surge protection logic analyzer 420 determines that one or more thresholds have been satisfied. For example, the surge protection logic analyzer 420 may direct the indicator module 422 to activate the electrical indicator 122 when the input voltage satisfies a threshold (e.g., the input voltage is greater than 50 VDC, 100 VAC, etc.).

In another example, the surge protection logic analyzer 420 may direct the communication interface 424 to perform an operation. For example, the surge protection logic analyzer 420 may direct the communication interface 424 to generate an alert message, a status message, etc., transmit the alert message, the status message, etc., etc. In such an example, the surge protection logic analyzer 420 may direct the communication interface 424 when the surge protection logic analyzer 420 determines that one or more thresholds has been satisfied. For example, the surge protection logic analyzer 420 may direct the communication interface 424 to generate and transmit an alert message to the DCS components 430 via the network 428 when the leakage current satisfies a threshold (e.g., the leakage current is greater than 50 milliamps, 200 milliamps, etc.).

In some examples, the surge protection logic analyzer 420 determines when to continue monitoring the input signal 400, the input signal return 402, etc. For example, the surge protection logic analyzer 420 may determine that a value of the input signal 400, the input signal return 402, etc., is negligible (e.g., the value is approximately 0 volts, 0 amps, etc.) corresponding to the first field device 114 being unpowered.

In some examples, the surge protection logic analyzer 420 stores information in the database 426 such as the value of a counter (e.g., the value of the first and the second counters, etc.), a value of the input signal 400 (e.g., a value of the input voltage, the input current, etc.), a value of the leakage current, a health status of the surge protector 100, etc. In some instances, the surge protection logic analyzer 420 retrieves information from the database 426 such as the value of the counter (e.g., the value of the first and the second counters, etc.).

In the illustrated example of FIG. 4, the surge protection manager 416 includes the communication interface 424 to generate an alert, an alert message, etc., based on a health status of the surge protector 100, an operational status of a power surge event, etc. For example, the communication interface 424 may generate and transmit one or more data packets including information corresponding to the health status of the surge protector 100, the operational status of the power surge event, etc. In such an example, the communication interface 424 may generate and transmit a data packet to the DCS components 430 via the network 428 including a status indicating that the surge protector 100 is damaged, degrading, non-operational, non-responsive, etc. In another example, the communication interface 424 may generate and transmit a data packet to the second field device 432 via the network 428 including a status indicating that the surge protector 100 is experiencing a power surge event (e.g., a primary power surge event, etc.) or has recently experienced and/or recovered from a power surge event.

In some examples, the communication interface 424 includes one or more wired interfaces such as Ethernet, Serial (e.g., RS-232, RS-485, etc.), etc., and/or a combination thereof that support one or more communication protocols. Alternatively, the example communication interface 424 may include one or more optical interfaces such as an optical link interface, a fiber-optic interface, etc. Additionally or alternatively, any other type of wired communication interface may be used. In some instances, the one or more wired interfaces are galvanically isolated, opto-isolated, etc. For example, the communication interface 424 may be galvanically isolated from the network 428, the DCS components 430, the second field device 432, etc.

In some examples, the communication interface 424 includes one or more wireless interfaces such as NFC, Wi-Fi, Wi-Fi Direct®, Bluetooth®. In some instances, the communication interface 424 includes one or more radiofrequency interfaces (e.g., a radio frequency identification tag, a cellular antenna, etc.), electromagnetic interfaces, infrared interfaces, etc., and/or a combination thereof that support one or more communication protocols. Additionally or alternatively, any other type of wireless communication interface may be used.

In the illustrated example of FIG. 4, the surge protection manager 416 includes the database 426 to record data (e.g., a value of a counter, a value of a leakage current, a health status of the surge protector 100, etc.). The example database 426 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 426 may additionally or alternatively be implemented by one or more double data rate (DDR) memories, such as DDR, DDR2, DDR3, DDR4, mobile DDR (mDDR), etc. The example database 426 may additionally or alternatively be implemented by one or more mass storage devices such as hard disk drive(s), compact disk drive(s), digital versatile disk drive(s), solid-state disk drive(s), etc. The example database 426 may additionally or alternatively be implemented by one or more silicon-based memory devices such as a resistive RAM (ReRAM), graphene-based memory chips, etc. While in the illustrated example the database 426 is illustrated as a single database, the database 426 may be implemented by any number and/or type(s) of databases. Furthermore, the data stored in the database 426 may be in any data format such as, for example, binary data, comma delimited data, tab delimited data, structured query language (SQL) structures, etc.

In the illustrated example of FIG. 4, the network 428 is a bus and/or a computer network. For example, the network 428 may be an internal controller bus, a process control network, etc. In some examples, the network 428 is a network with the capability of being communicatively coupled to the Internet. However, the network 428 may be implemented using any suitable wired and/or wireless network(s) including, for example, one or more data buses, one or more Local Area Networks (LANs), one or more wireless LANs, one or more cellular networks, one or more fiber optic networks, one or more satellite networks, one or more private networks, one or more public networks, etc. In the illustrated example, the network 428 enables the surge protector 100 to be in communication with the DCS component(s) 430 and the second field device 432. For example, the communication interface 424 may transmit a message to the DCS controller assembly 102 of FIGS. 1-3, a DCS controller assembly external to the DCS controller assembly 102 of FIGS. 1-3, a remote I/O module, a sensor, an actuator, a valve, a safety device, etc., via the network 428. As used herein, the phrase "in communication," including variances thereof, encompasses direct communication and/or indirect communication through one or more intermediary components and does not require direct physical (e.g., wired) communication and/or constant communication, but rather includes selective communication at periodic or aperiodic intervals, as well as one-time events. Alternatively, the example network 428 may be a direct wired connection from the example communication interface 424 to the DCS components 430 and/or the second field device 432.

In the illustrated example of FIG. 4, the DCS component(s) 430 is the DCS controller assembly 102 of FIGS. 1-3. For example, the communication interface 424 may transmit an alert message to the first and the second controllers 104, 106 via the network 428 (e.g., an internal communication bus to the DCS controller assembly 102, etc.). Additionally or alternatively, the DCS component(s) 430 may be an external DCS controller assembly to the DCS controller assembly 102 of FIGS. 1-3, a remote I/O module communicatively coupled to the DCS controller assembly 102 of FIGS. 1-3, etc., and/or any other type of DCS component (e.g., a controller, an I/O module, etc.).

In the illustrated example, the second field device 432 is an actuator controller electrically coupled to a safety device such as a valve. For example, the communication interface 424 may transmit an alert message including a non-responsive health status of the surge protector 100 to the actuator controller. In response to the actuator controller obtaining the alert message, the actuator controller may activate the safety device (e.g., open the valve, close the valve, etc.).

In the illustrated example of FIG. 4, the surge protector 100 includes the output signal 434 and the output signal return 436 to electrically couple with the first and the second controllers 104, 106 of the DCS controller assembly 102 of FIGS. 1-3. For example, the surge protector 100 may transmit a measurement from the first field device 114 to the first and the second controllers 104, 106, where the measurement has been processed by the voltage limiting module 408, the filter module 410, and the first and the second current limiting modules 412, 414. For example, the output signal 434 and the output signal return 436 may have been reduced from a first voltage to a second voltage, where the first voltage is a surge voltage (e.g., due to a power surge event, etc.) from the first field device 114 and the second voltage is a safe voltage (e.g., a voltage within a normal operating range of the first and the second controllers 104, 106, etc.). In another example, the output signal 434 and the output signal return 436 may have been reduced from a first current to a second current, where the first current is a surge current (e.g., due to a power surge event, etc.) from the first field device 114 and the second current is a safe current (e.g., a current within a normal operating range of the first I/O module 108, etc.).

While an example manner of implementing the surge protector 100 of FIGS. 1-3 is illustrated in FIG. 4, one or more of the elements, processes and/or devices illustrated in FIG. 4 may be combined, divided, re-arranged, omitted, eliminated and/or implemented in any other way. Further, the example voltage limiting module 408, the example filter module 410, the first and the second example current limiting modules 412, 414, the example surge protector manager 416, the example power module 418, the example surge protection logic analyzer 420, the example indicator module 422, the example communication interface 424, the example database 426 and/or, more generally, the example surge protector 100 of FIGS. 1-3 may be implemented by hardware, software, firmware and/or any combination of hardware, software and/or firmware. Thus, for example, any of the example voltage limiting module 408, the example filter module 410, the first and the second example current limiting modules 412, 414, the example surge protector manager 416, the example power module 418, the example surge protection logic analyzer 420, the example indicator module 422, the example communication interface 424, the example database 426 and/or, more generally, the example surge protector 100 of FIGS. 1-3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example voltage limiting module 408, the example filter module 410, the first and the second example current limiting modules 412, 414, the example surge protector manager 416, the example power module 418, the example surge protection logic analyzer 420, the example indicator module 422, the example communication interface 424, and/or the example database 426 is/are hereby expressly defined to include a non-transitory computer readable storage device or storage disk such as a memory, a digital versatile disk (DVD), a compact disk (CD), a Blu-ray disk, etc. including the software and/or firmware. Further still, the example surge protector 100 of FIGS. 1-3 may include one or more elements, processes and/or devices in addition to, or instead of, those illustrated in FIG. 4, and/or may include more than one of any or all of the illustrated elements, processes and devices.

Figure 5:
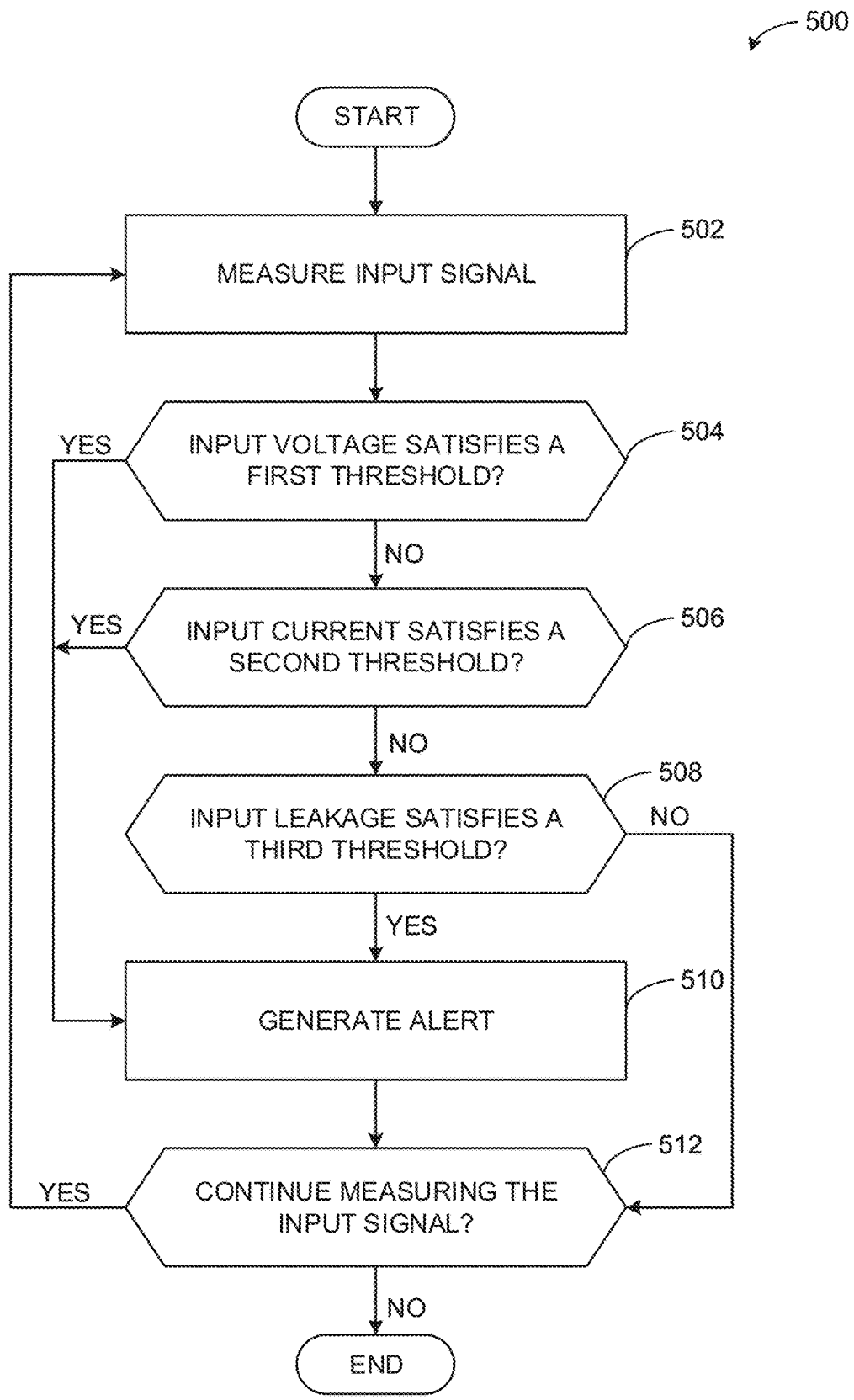
FIGS. 5-7 are flowcharts representative of example methods that may be performed using the example surge protector apparatus of FIGS. 1-4 for surge protection of a distributed control system component.
Figure 6:
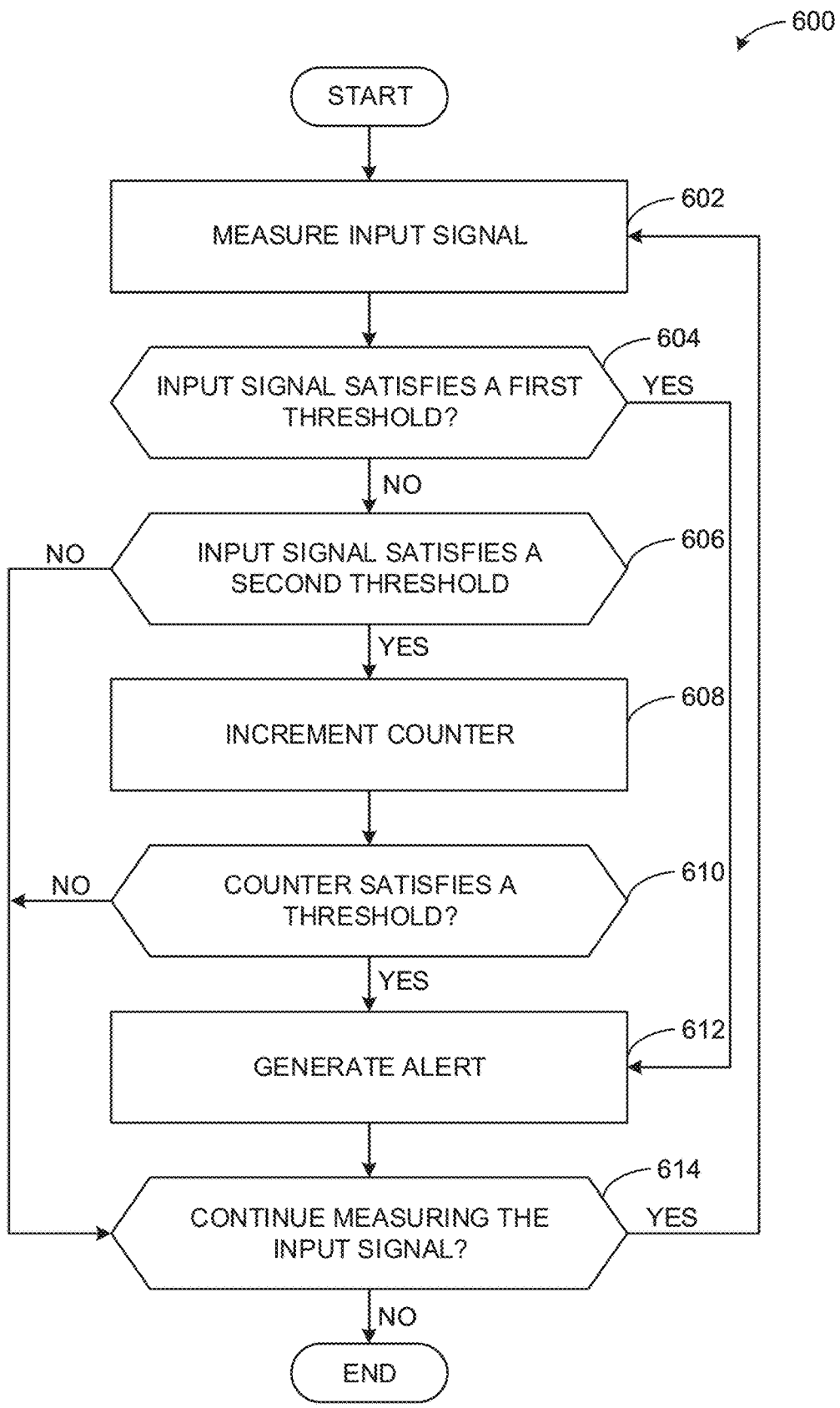
Figure 7:
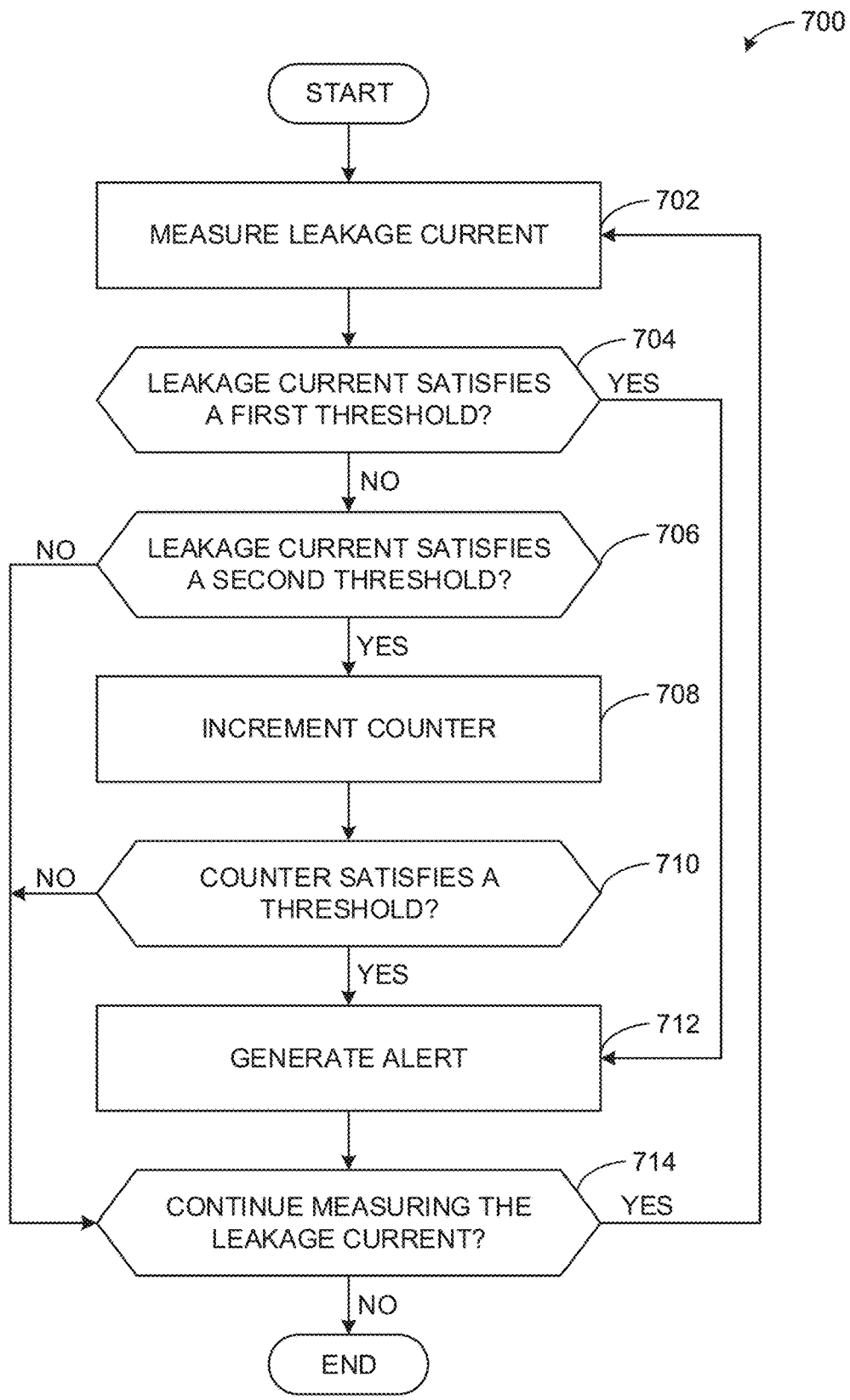

Flowcharts representative of example methods for implementing the example surge protector 100 of FIGS. 1-4 are shown in FIGS. 5-7. In these examples, the methods may be implemented using machine readable instructions comprise a program for execution by a processor such as the processor 812 shown in the example processor platform 800 discussed below in connection with FIG. 8. The program may be embodied in software stored on a non-transitory computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 5-7, many other methods of implementing the example surge protector 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

FIG. 5 is a flowchart representative of an example method 500 that may be performed by the example surge protector 100 of FIGS. 1-4 to perform surge protection for the DCS controller assembly 102 of FIGS. 1-3. The example method 500 begins at block 502 when the example surge protector 100 measures an input signal. For example, the voltage limiting module 408 may measure an input voltage corresponding to the input signal 400, the input signal return 402, the ground connection 404, etc. In another example, the first current limiting module 412 may measure an input current corresponding to the input signal 400. In yet another example, the second current limiting module 414 may measure a leakage current.

At block 504, the example surge protector 100 determines whether an input voltage satisfies a first threshold. For example, the voltage limiting module 408 may compare the input voltage to the first threshold and determine whether the input voltage satisfies the first threshold (e.g., the input voltage is greater than 50 VDC, 100 VAC, etc.). The first threshold may correspond to a major power surge event, a minor power surge event, etc.

If, at block 504, the example surge protector 100 determines that the input voltage satisfies the first threshold, control proceeds to block 510 to generate an alert. If, at block 504, the example surge protector 100 determines that the input voltage does not satisfy the first threshold, then, at block 506, the surge protector 100 determines whether an input current satisfies a second threshold. For example, the first current limiting module 412 may compare the input current to the second threshold and determine whether the input current satisfies the second threshold (e.g., the input current is greater than 0.5 amps, 1.5 amps, etc.). The second threshold may correspond to a major power surge event, a minor power surge event, etc.

If, at block 506, the example surge protector 100 determines that the input current satisfies the second threshold, control proceeds to block 510 to generate an alert. If, at block 506, the example surge protector 100 determines that the input current does not satisfy the second threshold, then, at block 508, the surge protector 100 determines whether a leakage current satisfies a third threshold. For example, the second current limiting module 414 may compare the leakage current to the third threshold and determine whether the leakage current satisfies the third threshold (e.g., the leakage current is greater than 10 milliamps, 100 milliamps, etc.). The third threshold may correspond to determining whether the example surge protector 100 is damaged, degraded, non-operational, non-responsive, etc.

If, at block 508, the example surge protector 100 determines that the leakage current does not satisfy the third threshold, control proceeds to block 512 to determine whether to continue measuring the input signal. If, at block 508, the example surge protector 100 determines that the leakage current does satisfy the third threshold, then, at block 510, the surge protector 100 generates an alert. For example, the indicator module 422 may activate the electrical indicator 122, the actuable surface 124, etc. In another example, the communication interface 424 may generate and transmit an alert message including a health status of the surge protector 100, a value of the leakage current, etc.

At block 512, the example surge protector 100 determines whether to continue measuring the input signal. For example, the surge protection logic analyzer 420 may determine that a value of the input signal 400 is negligible (e.g., approximately 0 volts, 0 amps, etc.) corresponding to the first field device 114 being unpowered. If, at block 510, the example surge protector 100 determines to continue measuring the input signal, control returns to block 502 to measure the input signal, otherwise the example method 500 concludes.

FIG. 6 is a flowchart representative of an example method 600 that may be performed by the example surge protector 100 of FIGS. 1-4 to perform surge protection for the DCS controller assembly 102 of FIGS. 1-3. The example method 600 begins at block 602 when the example surge protector 100 measures an input signal. For example, the voltage limiting module 408 may measure an input voltage corresponding to the input signal 400, the input signal return 402, the ground connection 404, etc. In another example, the first current limiting module 412 may measure an input current corresponding to the input signal 400. In yet another example, the second current limiting module 414 may measure a leakage current.

At block 604, the example surge protector 100 determines whether the input signal satisfies a first threshold. For example, the surge protection logic analyzer 420 may compare an input current to a first threshold and determine whether the input current satisfies the first threshold (e.g., the input current is greater than 1.5 amps, 2.5 amps, etc.). In such an example, the first threshold may correspond to a major power surge event, a first-tier power surge event, etc.

If, at block 604, the example surge protector 100 determines that the input signal satisfies the first threshold, control proceeds to block 612 to generate an alert. If, at block 604, the example surge protector 100 determines that the input signal does not satisfy the first threshold, then, at block 606, the surge protector 100 determines whether the input signal satisfies a second threshold. For example, the surge protection logic analyzer 420 may compare the input current to a second threshold and determine whether the input current satisfies the second threshold (e.g., the input current is greater than 500 milliamps, 750 milliamps, etc.). In such an example, the second threshold may correspond to a minor power surge event, a secondary-tier power surge event, etc.

If, at block 606, the example surge protector 100 determines that the input signal does not satisfy the second threshold, control proceeds to block 614 to determine whether to continue measuring the input signal. If, at block 606, the example surge protector 100 determines that the input signal satisfies the second threshold, then, at block 608, the surge protector 100 increments a counter. For example, the surge protection logic analyzer 420 may increment a value of a counter corresponding to a number of times a minor power surge event occurs.

At block 610, the example surge protector 100 determines whether the counter satisfies a threshold. For example, the surge protection logic analyzer 420 may compare a value of the counter to a threshold and determine whether the value satisfies the threshold (e.g., the value is greater than 3, 10, 30, etc.).

If, at block 610, the example surge protector 100 determines that the counter does not satisfy the threshold, control proceeds to block 614 to determine whether to continue measuring the input signal. If, at block 610, the example surge protector 100 determines that the counter satisfies the threshold, then, at block 612, the surge protector 100 generates an alert. For example, the indicator module 422 may activate the electrical indicator 122, the actuable surface 124, etc. In another example, the communication interface 424 may generate and transmit an alert message including a health status of the surge protector 100, a value of the input current, etc.

At block 614, the example surge protector 100 determines whether to continue measuring the input signal. For example, the surge protection logic analyzer 420 may determine that a value of the input signal 400 is negligible (e.g., approximately 0 volts, 0 amps, etc.) corresponding to the first field device 114 being unpowered. If, at block 614, the example surge protector 100 determines to continue measuring the input signal, control returns to block 602 to measure the input signal, otherwise the example method 600 concludes.

FIG. 7 is a flowchart representative of an example method 700 that may be performed by the example surge protector 100 of FIGS. 1-4 to determine a health status of the surge protector 100. The example method 700 begins at block 702 when the example surge protector 100 measures a leakage current. For example, the second current limiting module 414 may measure a leakage current.

At block 704, the example surge protector 100 determines whether the leakage current satisfies a first threshold. For example, the surge protection logic analyzer 420 may compare the leakage current to a first threshold and determine whether the leakage current satisfies the first threshold (e.g., the leakage current is greater than 500 milliamps, 750 milliamps, etc.). In such an example, the first threshold may correspond to the surge protector 100 in a first degraded condition, where the first degraded condition corresponds to the surge protector 100 requiring replacement (e.g., the surge protector 100 has failed, is non-responsive, etc.).

If, at block 704, the example surge protector 100 determines that the leakage current satisfies the first threshold, control proceeds to block 712 to generate an alert. If, at block 704, the example surge protector 100 determines that the leakage current does not satisfy the first threshold, then, at block 706, the surge protector 100 determines whether the leakage current satisfies a second threshold. For example, the surge protection logic analyzer 420 may compare the leakage current to a second threshold and determine whether the leakage current satisfies the second threshold (e.g., the input current is greater than 10 milliamps, 100 milliamps, etc.). In such an example, the second threshold may correspond to the surge protector 100 in a second degraded condition, where the second degraded condition corresponds to the surge protector 100 in an operational, but degrading condition.

If, at block 706, the example surge protector 100 determines that the leakage current does not satisfy the second threshold, control proceeds to block 714 to determine whether to continue measuring the leakage current. If, at block 706, the example surge protector 100 determines that the leakage current satisfies the second threshold, then, at block 708, the surge protector 100 increments a counter. For example, the surge protection logic analyzer 420 may increment a value of a counter corresponding to a number of times the leakage current satisfies the second threshold.

At block 710, the example surge protector 100 determines whether the counter satisfies a threshold. For example, the surge protection logic analyzer 420 may compare the value of the counter to a threshold and determine whether the value satisfies the threshold (e.g., the value is greater than 3, 10, 30, etc.).

If, at block 710, the example surge protector 100 determines that the counter does not satisfy the threshold, control proceeds to block 714 to determine whether to continue measuring the leakage current. If, at block 710, the example surge protector 100 determines that the counter satisfies the threshold, then, at block 712, the surge protector 100 generates an alert. For example, the indicator module 422 may activate the electrical indicator 122, the actuable surface 124, etc. In another example, the communication interface 424 may generate and transmit an alert message including a health status of the surge protector 100, a value of the leakage current, etc.

At block 714, the example surge protector 100 determines whether to continue measuring the leakage current. For example, the surge protection logic analyzer 420 may determine that a value of the input signal 400 is negligible (e.g., approximately 0 volts, 0 amps, etc.) corresponding to the first field device 114 being unpowered. If, at block 714, the example surge protector 100 determines to continue measuring the leakage current, control returns to block 702 to measure the leakage current, otherwise the example method 700 concludes.

Figure 8:
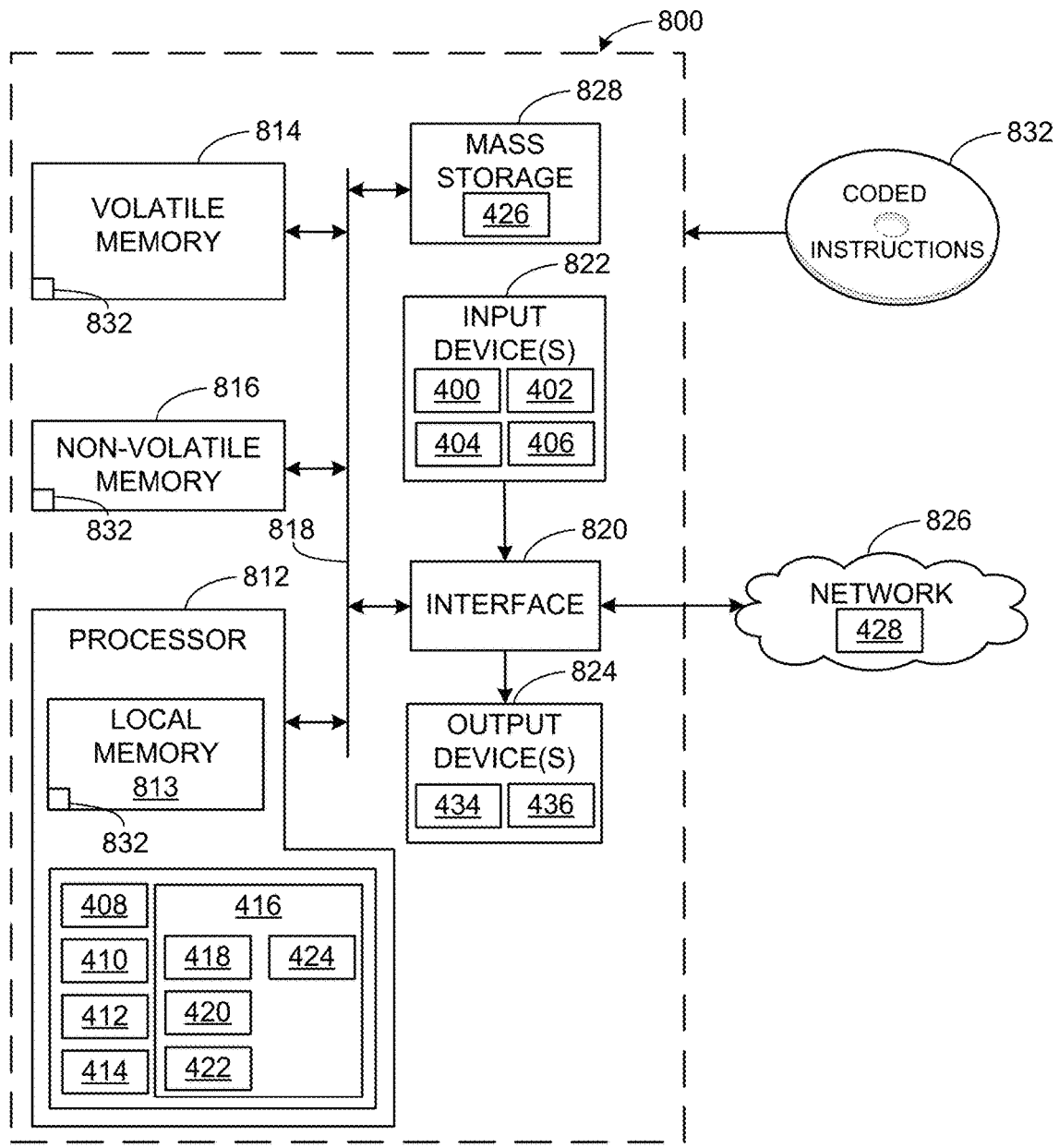
FIG. 8 is a block diagram of an example processor platform structured to execute machine readable instructions to implement the methods of FIGS. 5-7 and the example surge protector apparatus of FIGS. 1-4.

FIG. 8 is a block diagram of an example processor platform 800 capable of executing instructions implement the methods of FIGS. 5-7 to implement the example surge protector 100 of FIGS. 1-4. The processor platform 800 can be, for example, a programmable logic circuit, controller, etc., or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The hardware processor may be a semiconductor based (e.g., silicon based) device. In this example, the processor implements the example voltage limiting module 408, the example filter module 410, the first example current limiting module 412, and the second example current limiting module 414. The processor also implements the example power module 418, the example surge protection logic analyzer 420, the example indicator module 422, the example communication interface 424 and/or, more generally, the example surge protection manager 416.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user or a field device to enter data and/or commands into the processor 1012. The input device(s) can be implemented by, for example, a button, a keyboard, a mouse, a sensor, a touchscreen, a track-pad, a trackball, the first field device 114, isopoint and/or a voice recognition system. The input device(s) 1022 implements the input signal 400, the input signal return 402, the ground connection 404, and the protective earth connection 406.

One or more output devices 824 are also connected to the interface circuit 820 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The one or more output devices 824 implements the output signal 434 and the output signal return 436. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.). The network 826 implements the example network 428 of FIG. 4.

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives. The example mass storage device 828 implements the example database 426.

Coded instructions 832 to implement the methods of FIGS. 5-7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that perform surge protection for a distributed control system (DCS) controller and corresponding I/O modules. The above-disclosed surge protector apparatus reduces a need for external DIN rail mountable surge suppression devices as the above-disclosed surge protector apparatus is incorporated within the DCS controller, the I/O module, or the I/O module terminal block of a DCS controller assembly. Reduction of external surge suppression hardware improves a capability and performance of a process control system as additional components can be added in the place of the external surge suppression hardware. In addition, DCS components integrated with the above-disclosed surge protector apparatus benefit from increased performance due to increased protection and improved power quality of input signals.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a terminal block to be electrically coupled to a field device, the terminal block including:
      a surge protector to reduce an input voltage to an operating voltage when the input voltage satisfies a first threshold; and
      a communication interface to generate a status message when the input voltage satisfies the first threshold.

2. The apparatus of claim 1, wherein the surge protector is powered with the input voltage when the input voltage satisfies the first threshold.

3. The apparatus of claim 1, wherein the first threshold is based on an amplitude of the input voltage satisfying a second threshold or a counter corresponding to a number of times the amplitude of the input voltage satisfies the second threshold.

4. The apparatus of claim 1, wherein the status message includes a health status of the surge protector, the health status indicating replacement of the terminal block or the surge protector.

5. The apparatus of claim 1, further including an I/O module coupled to the terminal block, and a current limiting module to reduce an input current of the I/O module when the input current satisfies a second threshold and the communication interface to transmit the status message to a controller when the input current satisfies the second threshold, the status message including a value of the input current.

6. The apparatus of claim 1, further including:
   a current limiting module to:
      measure leakage current of the terminal block;
      compare the leakage current to a second threshold; and
   the communication interface to transmit the status message to a controller when the leakage current satisfies the second threshold, the status message including a value of the leakage current.

7. A method comprising:
   measuring an input voltage to a surge protector embedded in a terminal block to be electrically coupled to an I/O module and a field device;

reducing the input voltage to an operating voltage with the surge protector when the input voltage satisfies a first threshold; and generating a status message when the input voltage satisfies the first threshold.

8. The method of claim 7, further including powering the surge protector with the input voltage when the input voltage satisfies the first threshold.

9. The method of claim 7, wherein satisfying the first threshold includes comparing an amplitude of the input voltage to a reference voltage amplitude.

10. The method of claim 7, wherein satisfying the first threshold includes comparing a value of a counter to a second threshold, the value corresponding to a number of times an amplitude of the input voltage satisfies the first threshold.

11. The method of claim 7, wherein the status message includes a health status of the surge protector, the health status indicating replacement of the terminal block or the surge protector.

12. The method of claim 7, further including reducing an input current of the I/O module when the input current satisfies a second threshold and transmitting the status message to a controller when the input current satisfies the second threshold, the status message including a value of the input current.

13. The method of claim 7, further including:
measuring leakage current of the terminal block;
comparing the leakage current to a second threshold; and
transmitting the status message to a controller when the leakage current satisfies the second threshold, the status message including a value of the leakage current.

14. A non-transitory computer readable storage medium comprising instructions which, when executed, cause a machine to at least:
measure an input voltage to a surge protector embedded in a terminal block to be electrically coupled to an I/O module and a field device;
reduce the input voltage to an operating voltage with the surge protector when the input voltage satisfies a first threshold; and
generate a status message when the input voltage satisfies the first threshold.

15. The non-transitory computer readable storage medium of claim 14, wherein the instructions, when executed, cause the machine to at least power the surge protector with the input voltage when the input voltage satisfies the first threshold.

16. The non-transitory computer readable storage medium of claim 14, wherein the instructions, when executed, cause the machine to compare an amplitude of the input voltage to a reference voltage amplitude.

17. The non-transitory computer readable storage medium of claim 14, wherein the instructions, when executed, cause the machine to compare a value of a counter to a second threshold, the value corresponding to a number of times an amplitude of the input voltage satisfies the first threshold.

18. The non-transitory computer readable storage medium of claim 14, wherein the instructions, when executed, cause the machine to generate the status message by including a health status of the surge protector, the health status indicating replacement of at least one of the terminal block or the surge protector.

19. The non-transitory computer readable storage medium of claim 14, wherein the instructions, when executed, cause the machine to reduce an input current of the I/O module when the input current satisfies a second threshold and transmit the status message to a controller when the input current satisfies the second threshold, the status message including a value of the input current.

20. The non-transitory computer readable storage medium of claim 14, wherein the instructions, when executed, cause the machine to:
measure leakage current of the terminal block;
compare the leakage current to a second threshold; and
transmit the status message to a controller when the leakage current satisfies the second threshold, the status message including a value of the leakage current.

* * * * *